United States Patent Office 3,655,708
Patented Apr. 11, 1972

3,655,708
NICKEL SALTS OF MIXED ORGANIC ANIONS
Saul Gobstein, University Heights, Ohio, assignor to Ferro Corporation, Cleveland, Ohio
No Drawing. Continuation-in-part of application Ser. No. 736,003, June 11, 1968. This application Feb. 9, 1970, Ser. No. 9,982
Int. Cl. C07f 15/02, 45/62
U.S. Cl. 260—439 R      11 Claims

ABSTRACT OF THE DISCLOSURE

This invention relates to certain novel compositions of matter, and more particularly to nickel salts of mixed phenoxide anions, having particular utility as stabilizers in polyolefin polymers. The novel compositions of the present invention correspond to the general formula:

$x$ is a monovalent benzophenoxy anion within the scope of the formula:

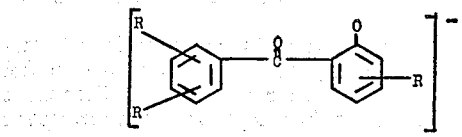

wherein the respective R groups may be the same or different, and each is a member selected from the group consisting of hydrogen atoms, hydroxyl radicals, alkyl radicals having less than about 15 carbon atoms, and alkoxy radicals having less than about 15 carbon atoms; $y$ is a bivalent bisphenol anion within the scope of the formula:

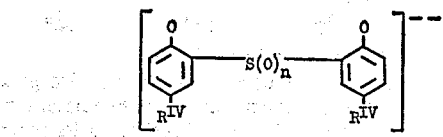

wherein $R^{IV}$ is alkyl or alkoxy, both of less than 15 carbon atoms, and $n$ is an integer having a value of 1 or 2; and
$z$ is a member selected from the group consisting of a hydrogen atom and the radical [Ni—$x$], $x$ being defined as above.

BACKGROUND OF THE INVENTION

This is a continuation-in-part of copending application Ser. No. 736,003, filed June 11, 1968, now abandoned.

Field of the invention

This invention relates to certain novel compositions of matter particularly useful in stabilizing polyolefin polymer compositions against degradation due to exposure to ultraviolet light. The novel compositions of the present invention are nickel salts of mixed organic anions, and polyolefin polymer compositions in which such nickel salts have been incorporated as ultraviolet light stabilizers.

Description of related prior art

There are, of course, a wide variety of materials which may be incorporated into polyolefin polymer compositions as stabilizers to inhibit degradation of the polymer composition on exposure to ultraviolet light. Included among these materials, to name but a few, are the following general classes of compounds, benzophenones (particularly hydroxybenzophenones); certain N-hydroxyaryl substituted benzotriazoles; the nickel salts of certain Schiff bases, the nickel salts or complexes of thiobis(alkylphenols), sulfinylbis(alkylphenols), and sulfonylbis(alkylphenols); and a wide variety of other organic and metal-organic compounds. In addition to the use of the foregoing materials by themselves as stabilizers in polymer compositions, it has been found that in many cases a combination of two or more of the known stabilizers can produce a synergistic stabilization effect superior to that obtained using the respective materials by themselves.

Phenolates of sulfur, and/or its oxides, particularly the nickel salts of such phenolates, have had very wide commercial acceptance as stabilizers in polyolefin polymer compositions. For example, U.S. Pats. 2,971,940 and 2,971,941 to Fuchsman et al. teach the use of certain nickel salts of a thiobis(p-alkylphenol) as light stabilizers in polyolefin compositions. Also, U.S. Pats, 3,072,601, 3,282,887 and 3,321,502 disclose certain nickel salts of a sulfonylbis(p-alkylphenol) and the utility of these compounds as light stabilizers in polyolefin polymer compositions. Such thiobis and sulfonylbis(p-alkylphenols) have in fact long been used commercially in the stabilization of polyolefins. In addition, it has recently been claimed in U.S. Pat 3,218,294 that (within certain narrow limits of processing conditions and polymer compositions) a mixture of (a) a nickel complex, or a nickel amine complex, of a thiobis(p-alkylphenol), (b) a 2-hydroxy-4-octyloxybenzophenone, can exhibit a substantial degree of synergism in the light stabilization of such polyolefin polymer compositions.

It is known that in the case of synergistic combinations of distinct additives, there are significant problems in obtaining optimum performance. The additives must be measured very carefully to assure that they are present in the right ratio to each other, as well as to the major (resinous) component. But even this is not sufficient if the additives are not uniformly distributed throughout the polymer composition, so that in each microscopic unit of volume of the polymer composition, each of the components required for the optimum synergistic action is present in exactly the required concentration.

The problem is further aggravated by any limitations on the solubility of one or both of the additives in the resin, which would lead to either segregation of the additive at regions of high additive concentration within the resin, or exudation of the additive to the surface where it may be lost by weathering or frictional contact. In either case the utility of the additive is decreased or lost entirely. This exudation tendency is notable among certain hydroxy-alkoxy-benzophenones, such as for example 2-hydroxy-4-methoxybenzophenone. The use of 2-hydroxy-4-alkoxybenzophenones having much larger alkoxy substituents was in large part a result of attempts to overcome the incompatibilities encountered with smaller alkoxy substituents.

It is generally agreed that the choice of stabilizers for a given polymer composition is a function not only of the degree of stabilization obtained from a given concentration of stabilizer (or stabilizers), but also a function of a wide variety of other factors. These factors include the use for which the finished article of manufacture (produced from the polymer composition) will be employed, the cost of obtaining a particular level of stabilization, and even the degree to which color and/or opacity can be tolerated. For example, most previously known nickel compounds employed as stabilizers in polyolefins impart a marked greenish tinge to the polyolefin composition if employed at concentrations even approximating those at which maximum stabilizing efficiency is obtained. Where color is not a factor, carbon black is almost unsurpassed as a stabilizer (both from the cost, and the stabilization point of view), in most applications.

SUMMARY OF THE INVENTION

In accordance with the present invention, it has now been found that it is possible to prepare certain novel chemical compounds which may be generally described as nickel salts of mixed phenoxide anions. It has been found that when these novel compounds are incorporated into polyolefin polymer compositions, novel polymer compositions are produced, having surprisingly increased light stability. It has also been found that, at the optimum stabilizing concentration the novel nickel salts of this invention do not impart an objectionable cast or coloration to the polymer composition.

The novel compositions of the present invention correspond to the general formula:

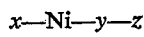

$x$ being a monovalent benzophenoxy anion within the scope of the formula:

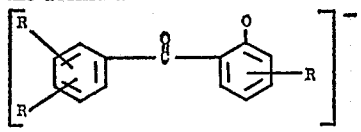

wherein the respective R groups may be the same or different, and each is a member selected from the class consisting of hydrogen atoms, hydroxyl radicals, alkyl radicals having less than about 15 carbon atoms, and alkoxy radicals having less than about 15 carbon atoms; $y$ is a bivalent bisphenol anion within the scope of the formula:

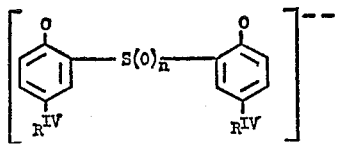

wherein $R^{IV}$ is either alkyl or alkoxy of less than 15 carbon atoms, and $n$ is an integer having a value of 1 or 2; and $z$ is a member selected from the class consisting of a hydrogen atom and the radical [Ni—$x$], $x$ being defined as above.

Typical groups which are represented by the R groups of the formulas include, but are not limited to, those in which the alkyl groups or the alkyl portions of the alkoxy groups are: methyl, ethyl, n-propyl, isopropyl, t-butyl, sec.-butyl, n-butyl, t-amyl, sec.-amyl, n-amyl, t-hexyl, sec.-hexyl, n-hexyl, t-heptyl, t-octyl, n-octyl, sec.-octyl, nonyl, decyl, dodecyl, pentadecyl, benzyl, phenethyl, cumyl, cyclohexyl, cycloheptyl, cyclohexylmethyl, etc.

As will be noted in more detail hereinafter, not all potentially desirable bisphenols are capable of participating in this reaction, under the specified conditions to form, ultimately, the desired nickel salt with mixed anions. In cases where a reaction product, in the presence of an otherwise chemically inert hydrocarbon solvent, tends to dissolve substantially more of the sulfur-bearing anion, than the carbonyl bearing anion, or vice versa, the reaction product may be presumed to be a mixture of products rather than a product with mixed anions.

Since the best known sulfur-bearing phenolate anion in the light stabilization of polyolefins, thiobis(p-tert.octyl-phenol) forms, under the reaction conditions of the present invention, a mixture which can readily be resolved into its components by solvent treatment, the discovery that the corresponding sulfinylbisphenol and sulfonylbisphenol yield products which cannot be so dissolved, is most surprising and highly unexpected. An even more impressive discovery is that even those compositions of the present invention in which the benzophenone moiety contains no long alkyl or alkoxy groups are readily soluble in solvents in which the starting benzophenone compound is essentially insoluble at lower temperatures.

It, therefore, appears that the advantages which accrue from the use of an additive which is hydrocarbon soluble, and in which the several contributors to light stabilization are combined as a single molecule, are attainable only by the proper choice of sulfur-containing components. A particularly important discovery is that the use of nickel compounds within the scope of the present invention, not only results in excellent retention of mechanical properties during prolonged exposure to ultraviolet light, but contributes very little change in color to the plastic composition during attendant light exposure concentrations effective for purposes of light stabilization.

The novel compositions of the present invention may be synthesized by the following general procedure:

(1) A benzophenone compound is dissolved in a suitable solvent and treated with an equal molar amount of a 50% sodium hydroxide solution, or other alkali metal hydroxide such as KOH, LiOH, etc.;

(2) In a separate vessel, the phenol is dissolved in a suitable solvent and treated with an equal molar amount of a 50% sodium hydroxide solution, or other alkali metal hydroxide;

(3) The solution of benzophenone and the solution of phenol are then combined and heated to a temperature slightly above room temperature;

(4) The combined solutions are treated with an equal molar amount of a solution of nickel chloride in an organic solvent.

By following this procedure (using one mole of benzophenone, to one mole of phenolate, to one mole of nickel chloride) a compound within the scope of Formula I would be produced, and the compound would correspond to the formula:

(IV)

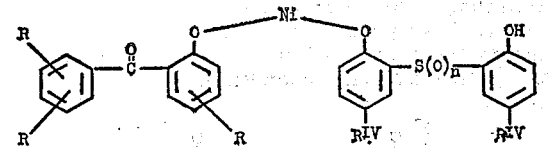

wherein R, $R^{IV}$ and $n$ are as defined above.

As will be seen in more detail hereinafter, it is also possible to use one-half the molar equivalent of phenolate, e.g. 1 mole of benzophenone, to 1 mole of nickel, to ½ mole of phenolate, otherwise using the same procedure, to produce a compound of the formula:

(V)

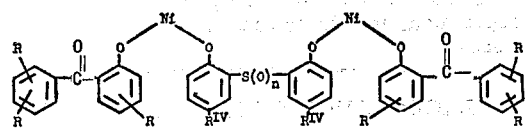

PREFERRED EMBODIMENTS

The preferred nickel compounds of the present invention are nickel salts containing two anions, the first anion being a 2-hydroxy-4-alkoxybenzophenone, and the second anion being a sulfonylbis(p-alkylphenol). The preferred polyolefin polymers of the present invention are polyethylene and polypropylene.

The following examples will serve by way of illustration and not by way of limitation to describe the method by which the novel nickel compounds of this invention are prepared, the manner in which they are incorporated in the polyolefin polymer compositions as light stabilizers, and the very surprising increase in light stability exhibited by polymer compositions into which the novel nickel compounds of the present invention have been incorporated.

EXAMPLE I 32.6 grams (0.1 mole) of 2 - hydroxy - 4 - octyloxybenzophenone is dissolved in 300 ml. of isopropyl alcohol and is treated with 8.0 grams (0.1 mole) of a 50% solution of sodium hydroxide. Using a separate vessel, 47.4 grams of 2,2'-sulfonylbis(p-octylphenol) is dissolved in 400 ml. of isopropyl alcohol, and is treated with 8.0 grams (0.1 mole) of a 50% solution of sodium hydroxide. The two solutions are combined and heated to a temperature of about 55° C. and a solution of 18.9 grams of nickel chloride (0.1 mole) in 50 ml. of methanol is added to the combined solutions of the benzophenone and the 2,2'-sulfonylbis(p-octylphenol). The reactants are then refluxed at 50° to 60° C. for one-half hour, cooled to room temperature and filtered. After the filtrate is washed with water and dried in vacuum, a yield of 83 grams (85.77% of theoretical) is obtained; Ni calculated 6.85, found 6.6; S calculated 3.73, found 3.79. Following infrared analysis and physical examination, the product is determined to be a single compound and is believed to correspond to the formula:

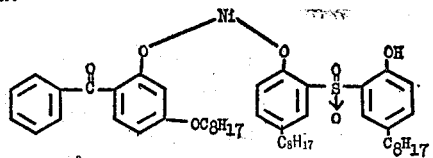

EXAMPLE II

The procedure of Example I is repeated substituting 0.1 mole of 2,2-thiobis(p-octylphenol) for the sulfonyl bis(p-octylphenol) of Example I. When the product is washed and dried in vacuum 85 grams of a pale green product is obtained. A preliminary inspection of the product gives no evidence of the presence of more than one compound. However, when attempts are made subsequently to recrystallize the product from hexane it is found that a portion of the product dissolves readily in the hexane while the remainder is insoluble. After additional testing it is determined that the product is a mixture of 2-hydroxy-4-octyloxybenzophenone and the nickel complex of 2,2-thiobis(p-octylphenol).

Following the results of Example II, the product of Example I is dissolved in hexane and is found to be readily soluble with no evidence of any undissolved product. A series of solubilities studies are conducted in hexane on the product of Example I, 2-hydroxy-4-octyloxybenzophenone, sulfonylbis(p-octylphenol) and the nickel complex of sulfonylbis(p-octylphenol), in order to further confirm the observation that the product of Example I is a single compound. The results of these solubility studies and the observations made in connection therewith are set forth in Example III.

EXAMPLE III

A series of solubility studies are conducted in hexane on the product of Example I, the raw materials used in the synthesis of this product, and the other available products which might be produced if a single compound is not formed in Example I. In the course of these solubility studies the following observations are made:

(1) 2-hydroxy-4-octyloxybenzophenone is readily soluble at room temperature at the 5% or 10% level,
(2) when the hexane solution of 2-hydroxy-4-octyloxybenzophenone is cooled with Dry Ice, the benzophenone precipitates out from solution,
(3) both 2,2'-sulfonylbis(p-octylphenol) itself and the nickel complex of 2,2'-sulfonylbis(p-octylphenol) are not soluble in hexane at room temperature at the 10% level,
(4) a mixture of 2,2'-sulfonylbis(p-octylphenol) and 2-hydroxy-4-oxtyloxybenzophenone gives ample evidence of substantial insolubility at the 10% level (that is at 5% of each component),
(5) a mixture of the nickel complex 2,2'-sulfonylbis(p-octylphenol and 2 - hydroxy-4-octyloxybenzophenone also gives clear evidence of substantial insolubility at the 10% level (again at 5% of each component),
(6) the product of Example I is readily and completely soluble in hexane at room temperature at the 10% level with no evidence of any insolubility and/or any insoluble phase,
(7) when the hexane solution of the product of Example I is cooled with Dry Ice the product is not precipitated out of solution,
(8) the results of the foregoing solubility tests would appear to confirm clearly the existence of a single compound in the isolated, purified product of Example I, and this observation is confirmed by subsequent testing and analysis.

A series of polymer test compositions are prepared using the product of Example I and a series of known polyolefin stabilizers, including a synergistic mixture of 2-hydroxy-4-octyloxybenzophenone and the nickel complex of 2,2'-thiobis(p-octylphenol). The exact formulations used in preparing the various test polymer compositions are set forth in Table I.

TABLE I

| | 1 | 2 | 3 | 4 |
|---|---|---|---|---|
| Polypropylene [1] | 100 | 100 | 100 | 100 |
| Irganox 1010 [2] | 0.1 | 0.1 | 0.1 | 0.1 |
| DSTDP [3] | 0.25 | 0.25 | 0.25 | 0.25 |
| Ni salt of 2,2'-thiobis(p-octylphenol) | 0.4 | | 0.2 | |
| 2-hydroxy-4-alkoxybenzophenone | | 0.4 | 0.2 | |
| Compound of Example I | | | | 0.4 |

[1] Isotactic polypropylene containing no additional stabilizer.
[2] A commercial phenolic antioxidant.
[3] Distearyl thiodipropionate.

The results obtained in composition light stability testing of the compositions of Table I are contained in Table II. As set forth in Table II the figures indicate tensile strength, in p.s.i., of the composition before exposure and after 150 hours of exposure in accelerated testing. Six samples of each composition are tested at each time interval, and the figures in parentheses after the tensile strength after 150 hours exposure indicate the number of samples which were determined to have failed, e.g. (4/6) indicates four samples failed. The data on those samples which failed were omitted in computing the tensile strength, etc.

TABLE II

| | 0 hours | 150 hours | Percent retention of physicals |
|---|---|---|---|
| Composition No. (from Table I): | | | |
| 1 | 622 | — (6/6) | |
| 2 | 577 | 462 (0/6) | 80 |
| 3 | 561 | 510 (0/6) | 91 |
| 4 | 642 | 600 (0/6) | 93.5 |

A wide variety of other novel compounds within the scope of the present invention are prepared in a manner similar to that set forth in Example I, except that a different benzophenone compound is substituted for that employed in Example I, or a different bisphenol compound for that employed in Example I. The preparation of these compounds is described in the following examples.

EXAMPLE IV

The procedure of Example II is repeated substituting 4,4'-dimethoxy-2,2'-dihydroxybenzophenone, on an equal molar parts basis, for the 2-hydroxy-4-octyloxybenzophenone of Example II. The product is collected and purified, and after a wide variety of physical and analytical testing, including attempted separation by means of solvents, it is determined that the product is a single compound. Ni found 6.89, calc. 7.3; S found 3.69, calc. 3.98. The compound is believed to correspond to the formula:

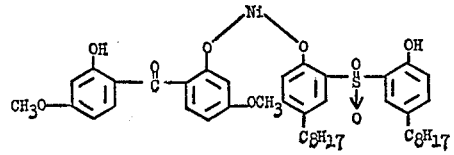

EXAMPLE V

The procedure of Example I is repeated substituting 2-hydroxy-4-methoxybenzophenone on an equimolar basis for the 2-hydroxy-4-octyloxybenzophenone of Example I. The product is collected and purified, and after a wide variety of physical and analytical testing, including attempted separation by means of solvents, it is determined that the product is a single compound. Ni found 8.3, Calc. 7.76; S found 4.12, calc. 4.24. The compound is believed to correspond to the formula:

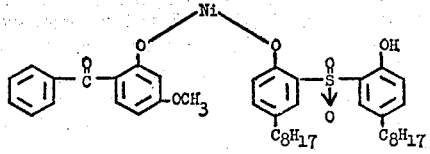

EXAMPLE VI

The procedure of Example I is repeated substituting 2,2'-sulfinylbis(p-octylphenol) for the 2,2' - sulfonylbis-(p-octylphenol) of Example I. The product is collected and purified, and after a wide variety of physical and analytical testing, including attempted separation by means of solvents, it is determined that the product is a single compound. Ni found 6.87, calc. 6.93; S found 3.80, calc. 3.78. The compound is believed to correspond to the formula

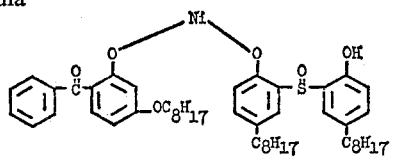

EXAMPLE VII

The procedure of Example I is repeated using one molar equivalent of nickel to one molar equivalent of 2-hydroxy-4-octyloxybenzophenone to one-half the molar equivalent of 2,2' - sulfonylbis(p-octylphenol), otherwise following the procedures and conditions of Example I. The product is collected and purified, and after a wide variety of physical and analytical testing, including attempted separation by means of solvents, it is determined that the product is a single compound. Ni found 9.92, calc. 9.45; S found 2.42, calc. 2.41. The compound is believed to correspond to the formula:

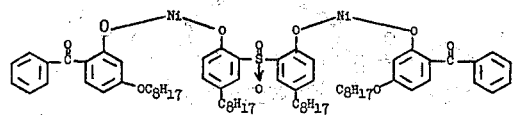

Each of the compounds prepared in Examples IV, V, VI and VII is subsequently incorporated into a series of polyolefin polymer compositions including polyethylene, polypropylene, ethylenebutene copolymers, and the like. In every instance these compounds are found to be useful as stabilizers.

Typical compounds of this invention that can be prepared according to the above syntheses are those identified in the table below by the various groups represented by $x$, $y$ and $z$ as in the formula $x$—Ni—$y$—$z$:

TABLE—Continued

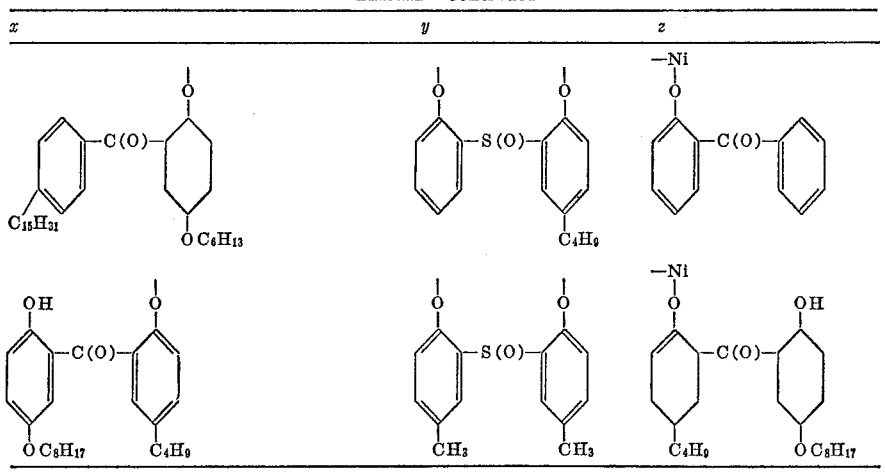

It will, of course, be obvious that many changes, alterations and substitutions can be made in the foregoing compositions, materials, methods, apparatus and procedure without departing from the scope of the invention herein disclosed, and it is our intention to be bound only to the scope of the appended claims.

The invention claimed is:

1. A composition of matter corresponding to the general formula:

$$x\text{—Ni—}y\text{—}z$$

$x$ being a monovalent benzophenoxy anion within the scope of the formula:

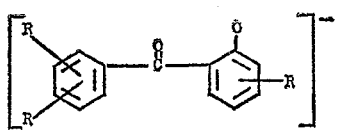

wherein the respective R groups may be the same or different, and each is a member selected from the group consisting of hydrogen atoms, hydroxyl radicals, alkyl radicals having less than about 15 carbon atoms, and alkoxy radicals having less than about 15 carbon atoms; $y$ is a bivalent bisphenol anion within the scope of the formula:

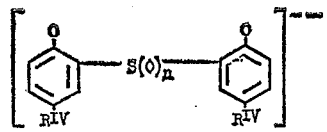

wherein $R^{IV}$ is a member having less than 15 carbon atoms selected from the class consisting of alkyl and alkoxy groups and $n$ is an integer having a value of 1 or 2; and $z$ is a member selected from the group consisting of a hydrogen atom and the radical [Ni—$x$], $x$ being defined as above.

2. The composition of matter according to claim 1 wherein said monovalent benzophenoxy anion is a benzophenone having at least one hydroxyl radical ortho to the carbonyl and is a member selected from the group consisting of hydroxyalkoxybenzophenone, dihydroxybenzophenone and dihydroxy dialkoxybenzophenone.

3. The composition of matter according to claim 1 wherein said bivalent bisphenol anion is the bivalent anion of a 2,2'-sulfonylbis(p-alkylphenol).

4. The composition of matter according to claim 2 wherein said bivalent bisphenol anion is the bivalent anion of a 2,2'-sulfonylbis(p-alkylphenol).

5. The composition of matter according to claim 1 wherein said bivalent bisphenol anion is the bivalent anion of a 2,2'-sulfinylbis(p-alkylphenol).

6. The composition of matter according to claim 2 wherein said bivalent bisphenol anion is the bivalent anion of a 2,2'-sulfinylbis(p-alkylphenol).

7. The process for producing compounds of claim 1 comprising the step of treating the alkali metal salt of a hydroxy benzophenone with a nickel salt and the alkali metal salt of a bisphenol compound corresponding to the formula:

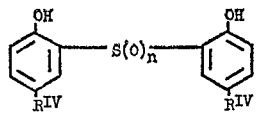

wherein $n$ is an integer having a value of 1 or 2 and $R^{IV}$ is a member having less than 15 carbon atoms selected from the class consisting of alkyl and alkoxy groups, said hydroxy benzophenone having the formula:

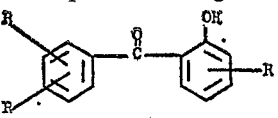

wherein R is a member selected from the group consisting of hydrogen atoms, hydroxyl radicals, alkyl radicals having less than about 15 carbon atoms, and alkoxy radicals having less than about 15 carbon atoms.

8. The process of claim 7 wherein said benzophenone is treated with essentially an equimolar quantity of said nickel salt and essentially an equimolar quantity of a 2,2'-sulfonylbis(p-octylphenol).

9. The process of claim 7 wherein said benzophenone is treated with essentially an equimolar quantity of said nickel salt and essentially an equimolar quantity of a 2,2'-sulfinylbis(p-octylphenol).

10. The process of claim 7 wherein said benzophenone is treated with essentially an equimolar quantity of a nickel salt and essentially one-half of the molar equivalent of a 2,2'-sulfonylbis(p-octylphenol).

11. The process of claim 7 wherein said benzophenone is treated with essentially an equimolar quantity of a nickel salt and essentially one-half of the molar equivalent of a 2,2'-sulfinylbis(p-octylphenol).

References Cited

UNITED STATES PATENTS

| | | | |
|---|---|---|---|
| 3,098,863 | 7/1963 | Dessauer et al. | 260—439 |
| 3,218,294 | 11/1965 | Rodgers | 260—45.75 |
| 3,321,502 | 5/1967 | Soeder | 260—439 |

TOBIAS E. LEVOW, Primary Examiner

A. P. DEMERS, Assistant Examiner

U.S. Cl. X.R.

260—45.75 N